(12) United States Patent
Yeh et al.

(10) Patent No.: US 7,364,456 B2
(45) Date of Patent: Apr. 29, 2008

(54) FLEXIBLE CONTACT DEVICE FOR USE WITH A BATTERY

(75) Inventors: Chen-Kuang Yeh, Taipei (TW); Hung-Hsiang Sung, Taipei (TW)

(73) Assignee: Premier Image Technology Corporation, Taipei (TW)

( * ) Notice: Subject to any disclaimer, the term of this patent is extended or adjusted under 35 U.S.C. 154(b) by 29 days.

(21) Appl. No.: 11/226,271

(22) Filed: Sep. 15, 2005

(65) Prior Publication Data
US 2007/0059976 A1   Mar. 15, 2007

(51) Int. Cl.
*H01R 3/00* (2006.01)

(52) U.S. Cl. .......................................... 439/500; 439/66

(58) Field of Classification Search ................ 439/500, 439/66
See application file for complete search history.

(56) References Cited

U.S. PATENT DOCUMENTS 6,280,254 B1 * 8/2001 Wu et al. .................... 439/630
6,379,199 B1 * 4/2002 Chen .......................... 439/852

* cited by examiner

*Primary Examiner*—Truc T Nguyen
(74) *Attorney, Agent, or Firm*—Rosenberg, Klein & Lee

(57) ABSTRACT

A flexible contact device is installed in an electronic apparatus for contacting with the battery and transmitting electrical power from the battery to the electronic apparatus. The flexible contact device for use with a battery includes a fixing part, a first flexible arm, and a second flexible arm. The first flexible arm extends from one side of the fixing part and a contacting part is formed at one end of the first flexible arm. The second flexible arm extends from another side of the fixing part. A pushing part is formed at one end of the second flexible arm. The pushing part pushes the inner side of the first flexible arm. Thereby, the flexible contact device provides enough contacting force and reduces the contacting resistance. The deformation of the flexible contact device is low and the rebound of the flexible contact device is good.

3 Claims, 5 Drawing Sheets

FLEXIBLE CONTACT DEVICE FOR USE WITH A BATTERY

BACKGROUND OF THE INVENTION

1. Field of the Invention

The present invention relates to a flexible contact device for use with a battery. In particular, a flexible contact device is installed in an electronic apparatus to contact the battery and transmit electrical power from the battery to the electronic apparatus.

2. Description of the Related Art

Batteries are installed in electronic apparatuses (such as digital still cameras) for providing electrical power to the electronic apparatus. There are a plurality of flexible contact devices in the battery chamber of the electronic apparatus. The flexible contact devices electrically connect to a circuit unit of the electronic apparatus. When a battery (such as a lithium battery) is installed in the battery chamber, the electric contacting point of the battery contacts the flexible contact device. Thereby, electrical power from the battery is transmitted to the circuit unit of the electronic apparatus and provides electrical power to the electronic apparatus.

FIG. 1 shows a flexible contact device 8 of the prior art. The flexible contact device 8 adopts a single arm design. The flexible contact device 8 has a flexible arm 81. The electric contacting point of the battery 9 contacts the flexible arm 81 of the flexible contact device 8 to make the battery electrically contact with the flexible contact device.

The flexible contact device 8 of the prior art contacts the battery 9 via a single flexible arm 81. However, the flexibility of the flexible arm 81 does not provide enough contacting force. The flexible arm 81 deforms easily and the rebounding force is lessened. Furthermore, there are many batteries of different sizes available on the market; the flexible arm 81 can't ensure that enough contacting force is provided for every battery.

SUMMARY OF THE INVENTION

One particular aspect of the present invention is to provide a flexible contact device for use with a battery. The flexible contact device adopts a two-arm design to provide enough contacting force and the contacting resistance is very low. It does not suffer from the problems of deformation and low flexibility.

Another particular aspect of the present invention is to provide a flexible contact device for use with a battery. The present invention reduces the space needed for the flexible contact device to meet the requirements of electronic apparatuses, such as being light, thin, and small.

The flexible contact device for use with a battery includes a fixing part, a first flexible arm and a second flexible arm. The first flexible arm extends from one side of the fixing part and a contacting part is formed at one end of the first flexible arm. The second flexible arm extends from another side of the fixing part. A pushing part is formed at one end of the second flexible arm. The pushing part pushes the inner side of the first flexible arm.

Another flexible contact device for use with a battery includes a fixing part, a first flexible arm and a second flexible arm. The first flexible arm extends from one side of the fixing part and a contacting part is formed at one end of the first flexible arm. The second flexible arm extends from another side of the fixing part. A pushing part is formed at one end of the second flexible arm. The pushing part pushes the inner side of the first flexible arm. A through hole is located on the second flexible arm and the location corresponds to the contacting part of the first flexible arm.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
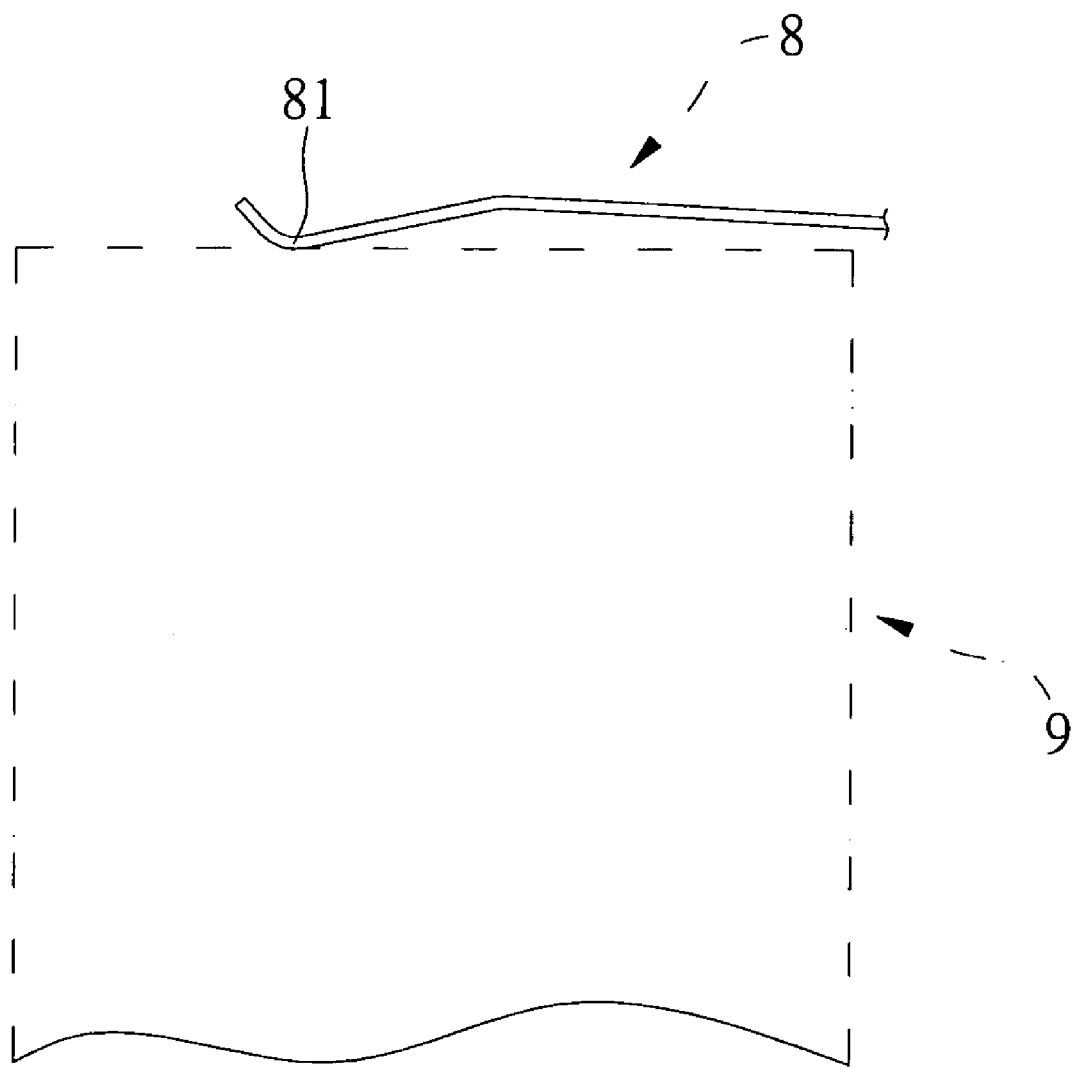
FIG. 1 is a schematic view of the operation status of the flexible contact device for use with a battery of the prior art.
Figure 2:
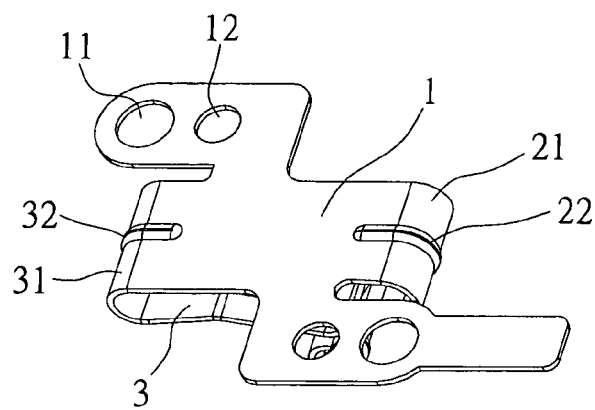
FIG. 2 is a perspective view of the flexible contact device for use with a battery of the present invention.
Figure 3:
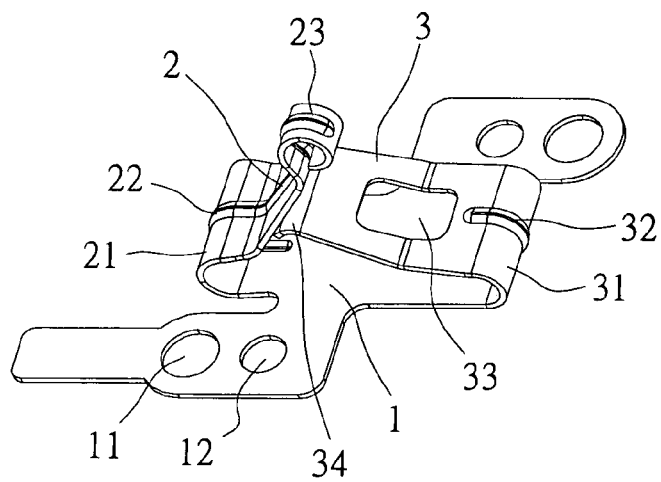
FIG. 3 is another perspective view of the flexible contact device for use with a battery of the present invention.
Figure 4:
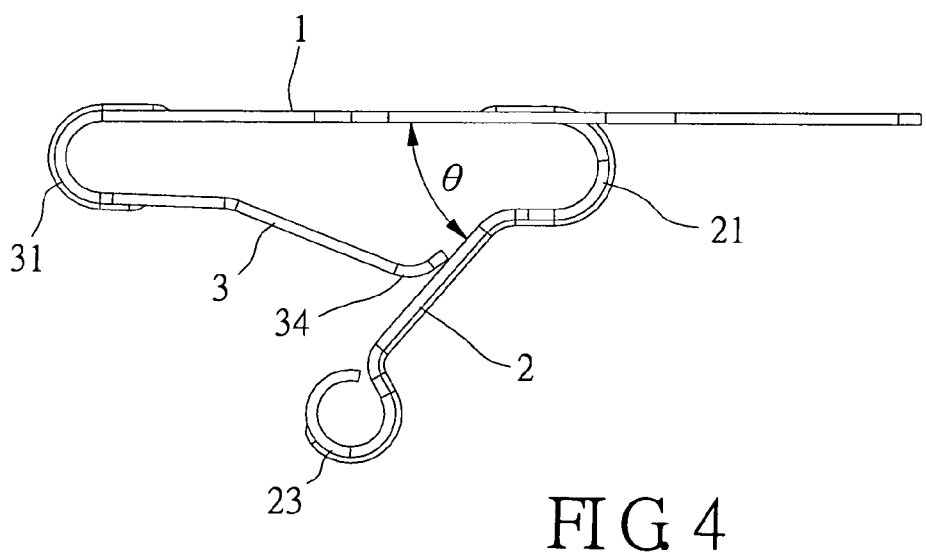
FIG. 4 is a front elevational view of the flexible contact device for use with a battery of the present invention.

Please refer to FIGS. 1~4, which show the flexible contact device for use with a battery of the present invention. The flexible contact device is made of a metal material that is a good electrical conductor and is very flexible, such as a copper alloy. The flexible contact device for use with a battery includes a fixing part 1, a first flexible arm 2 and a second flexible arm 3. The fixing part 1 is plate shaped. The shape and the structure of the fixing part are not limited and can be modified according to a user's requirements. The fixing part 1 has two fixing holes 11 and two positioning holes 12. The fixing part 1 is fixed to an electronic apparatus 5 by installing screws through the two fixing holes 11 (shown in FIG. 5 and FIG. 6) and fitting the two positioning holes 12 with the two positioning pins 51 that are located on the electronic apparatus 5.

The first flexible arm 2 extends from one side of the fixing part 1. The first flexible arm 2 tilts with the fixing part 1 at an angle $\theta$. The angle $\theta$ is less than 90 degrees. One end of the first flexible arm 2 forms a first connecting part 21. The shape of the first connecting part 21 is an arc and the first connecting part 21 connects to one side of the fixing part 1. A first enhanced rib 22 is formed at the first flexible arm 2 and the first connecting part 21 by a punching process in order to enhance the strength of the first flexible arm 2. A contacting part 23 is formed at another end of the first flexible arm 2. The shape of the contacting part 23 is circular or another appropriate shape. The contacting part 23 connects to the electric contacting point of the battery. The first enhanced rib 22 extends to the contacting part 23.

The second flexible arm 3 extends from another side of the fixing part 1. The second flexible arm 3 tilts with the fixing part 1 at an angle $\theta_1$. One end of the second flexible arm 3 forms a second connecting part 31. The second connecting part 31 connects to another side of the fixing part 1. A second enhanced rib 32 is formed at the second flexible arm 3 and the second connecting part 31 by a punching process in order to enhance the strength of the second flexible arm 3. A through hole 33 is formed at the second flexible arm 3 and its location corresponds to the contacting part 23 of the first flexible arm 2. A pushing part 34 is formed at another end of the second flexible arm 3. The shape of the pushing part 34 is circular. The pushing part 34 pushes the inner side of the first flexible arm 2.

Figure 5:
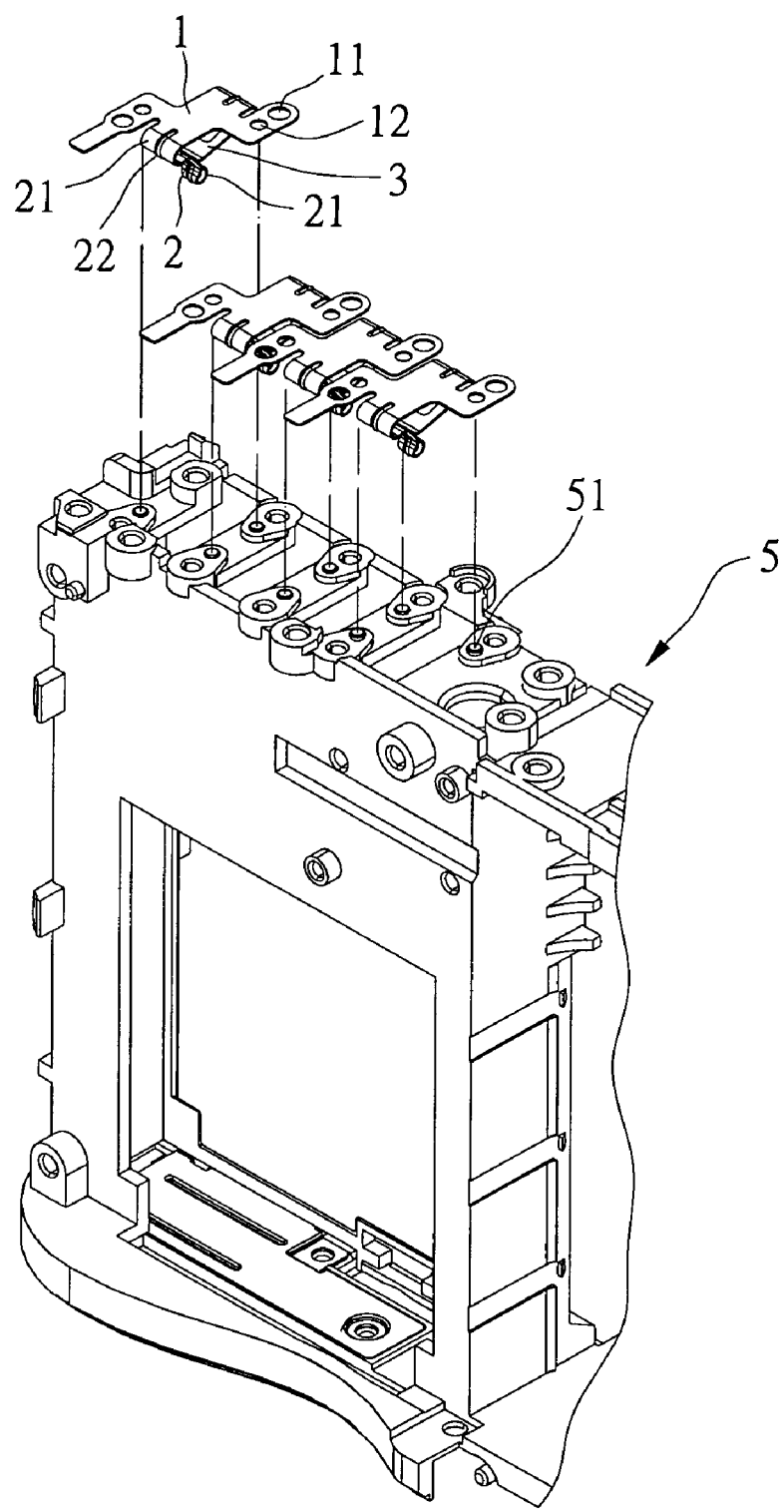
FIG. 5 is a schematic view of the flexible contact device for use with a battery of the present invention that is installed in an electronic apparatus.
Figure 6:
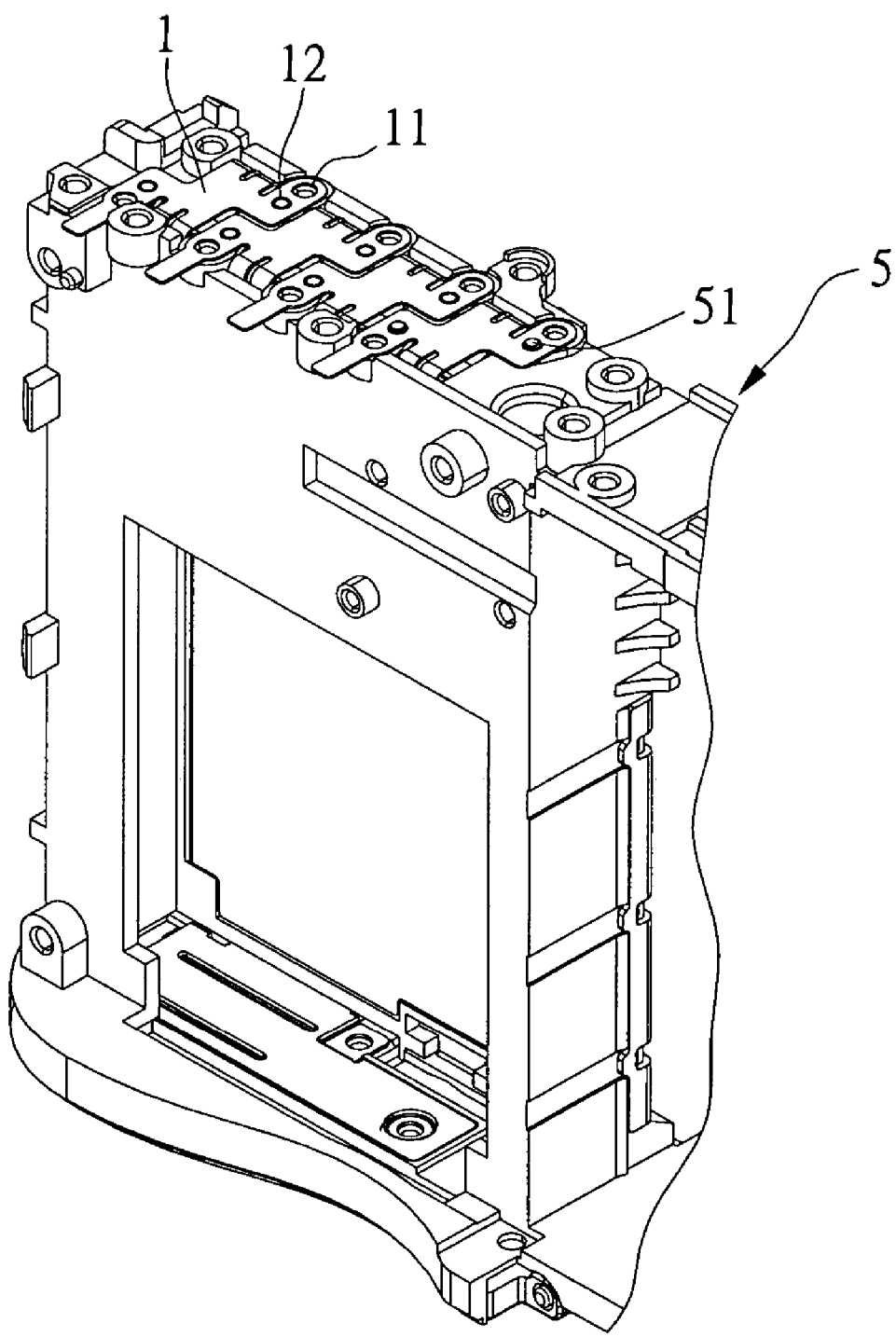
FIG. 6 is another schematic view of the flexible contact device for use with a battery of the present invention installed in a electronic apparatus.
Figure 7:
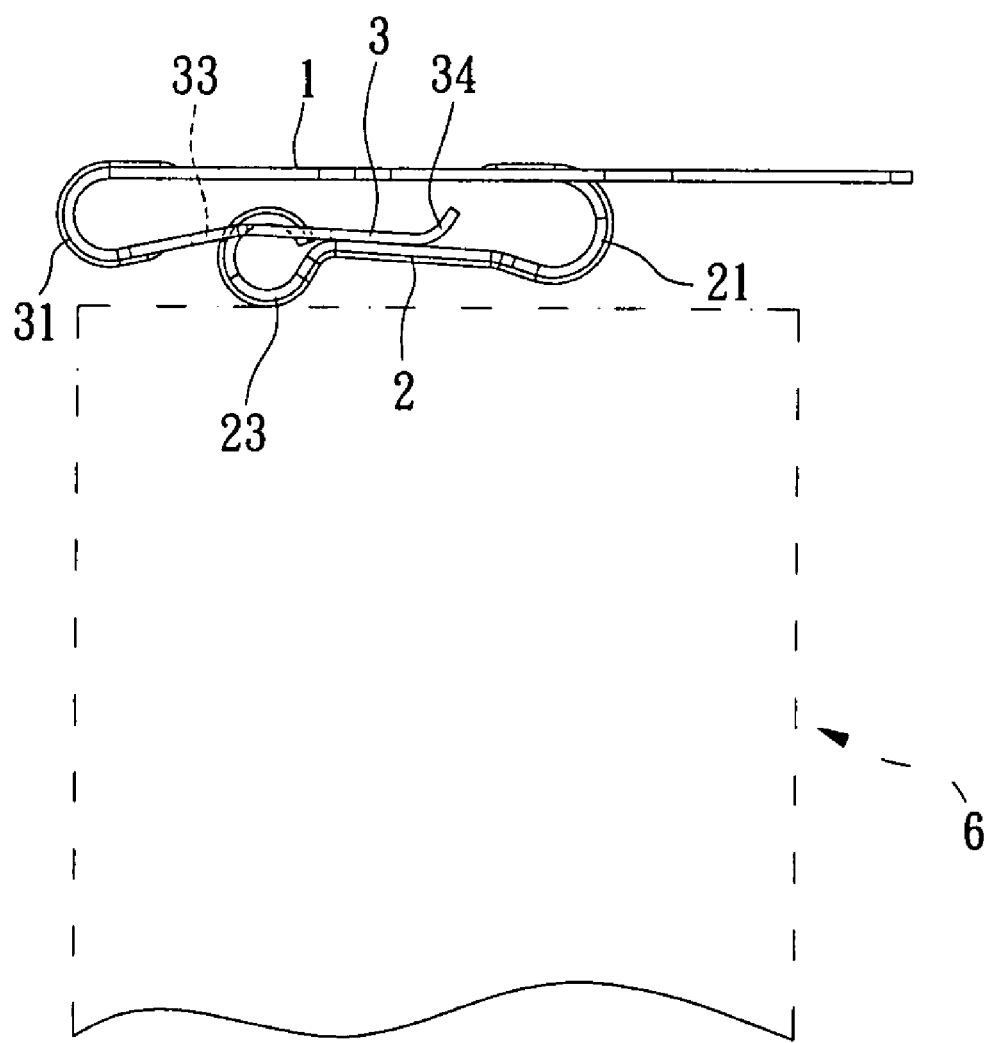
FIG. 7 is a schematic view of the operation status of the flexible contact device for use with a battery of the present invention.

FIG. 5 and FIG. 6 show schematic views of the flexible contact device for use with a battery of the present invention that is installed in an electronic apparatus. The flexible contact device is fixed to an electronic apparatus 5 by the fixing part 1. The first flexible arm 2 and the second flexible arm 3 are inserted into the battery chamber of the electronic apparatus 5. Please refer to FIG. 7, which shows a battery 6 (such as a lithium battery) placed into the battery chamber. The electric contacting point of the battery 6 closely contacts the contacting part 23 of the second flexible arm 2. Electrical power from the battery 6 is transmitted to the circuit unit of the electronic apparatus 5 via the flexible contact device.

The flexible contact device for use with a battery of the present invention adopts a two-arms design. The flexible contact device has two flexible arms 2 and 3. The second flexible arm 3 pushes the inner side of the first flexible arm 2. Thereby, the flexibility of the flexible contact device is enhanced. Therefore, when the first flexible arm 2 contacts the battery 6, the flexible contact device provides enough contacting force and reduces the contacting resistance. The deformation is of the flexible contact device low and the rebound of the flexible contact device is good.

Moreover, there is a through hole 33 in the second flexible arm 3. So that, when the contacting part 23 of the first flexible arm 2 reaches the dead point, the contacting part 23 of the first flexible arm 2 is inserted into the through hole 33 of the second flexible arm 3. Thereby, it reduces the space needed for the flexible contact device to meet the requirements of electronic apparatuses, such as being light, thin, and small.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A flexible contact device for use with a battery, comprising:
    a fixing part;
    a first flexible arm extending from one side of the fixing part, the first flexible arm having a contacting part formed at a distal end thereof; and
    a second flexible arm extending from another side of the fixing part, the second flexible arm having a pushing part formed thereon, the pushing part being disposed in contiguous contact with an inner side of the first flexible arm to apply a bias force thereto, the second flexible arm having a through hole formed therein for receiving a portion of the contacting part of the first flexible arm therein responsive to a fixed displacement of the first flexible arm by contact with a battery.

2. The flexible contact device for use with a battery as claimed in claim 1, wherein the contacting part of the first flexible arm has a substantially circular longitudinal cross-sectional contour.

3. The flexible contact device for use with a battery as claimed in claim 2, wherein the second flexible arm has a through hole formed therein for receiving a portion of the contacting part of the first flexible arm therein responsive to a fixed displacement of the first flexible arm by contact with a battery.

* * * * *